United States Patent [19]

Clark

[11] Patent Number: 4,692,756
[45] Date of Patent: Sep. 8, 1987

[54] DEVICE FOR GENERATING A 2-AXIS CONTROL SIGNAL

[75] Inventor: David G. Clark, Redhill, United Kingdom

[73] Assignee: U.S. Philips Corporation, New York, N.Y.

[21] Appl. No.: 628,012

[22] Filed: Jul. 5, 1984

[30] Foreign Application Priority Data

Jul. 4, 1983 [GB] United Kingdom ............... 8318103

[51] Int. Cl.⁴ .............................................. G09G 1/00
[52] U.S. Cl. ..................................... 340/709; 340/706;
340/365 P; 178/18; 74/471 X Y
[58] Field of Search ............... 340/706, 709, 710, 810;
74/471 X Y; 178/18

[56] References Cited

U.S. PATENT DOCUMENTS

| | | | |
|---|---|---|---|
| 3,046,336 | 7/1962 | Leavitt et al. | 178/18 |
| 3,838,211 | 9/1974 | Joannou | 178/18 |
| 4,071,690 | 1/1978 | Joannou | 178/18 |
| 4,129,746 | 12/1978 | Lambden | 178/18 |
| 4,521,773 | 6/1985 | Lyon | 340/710 |

Primary Examiner—Marshall M. Curtis
Assistant Examiner—Ruffin B. Cordell
Attorney, Agent, or Firm—David R. Treacy

[57] ABSTRACT

An X-Y signal generator comprising a guide block having parallel cylindrical guide surfaces at opposite edges of the block, and a sleeve closely fitting about the block and riding on those surfaces. A planar window area is arranged close to the sleeve along a flat face of the block, with an identifiable actuating part of the sleeve appearing within the window. Finger pressure on the actuating part permits finger movement and direction parallel to the cylindrical surfaces to slide the sleeve in that direction, and finger movement in the orthogonal direction rotates the sleeve about the cylindrical surfaces. Movement of a surface of the sleeve, preferably at the opposite side of the block from the window, is sensed to provide electrical signals corresponding to the direction and distance of movement. Preferably, light gratings aligned in each of the two directions are formed directly on the sleeve.

16 Claims, 7 Drawing Figures

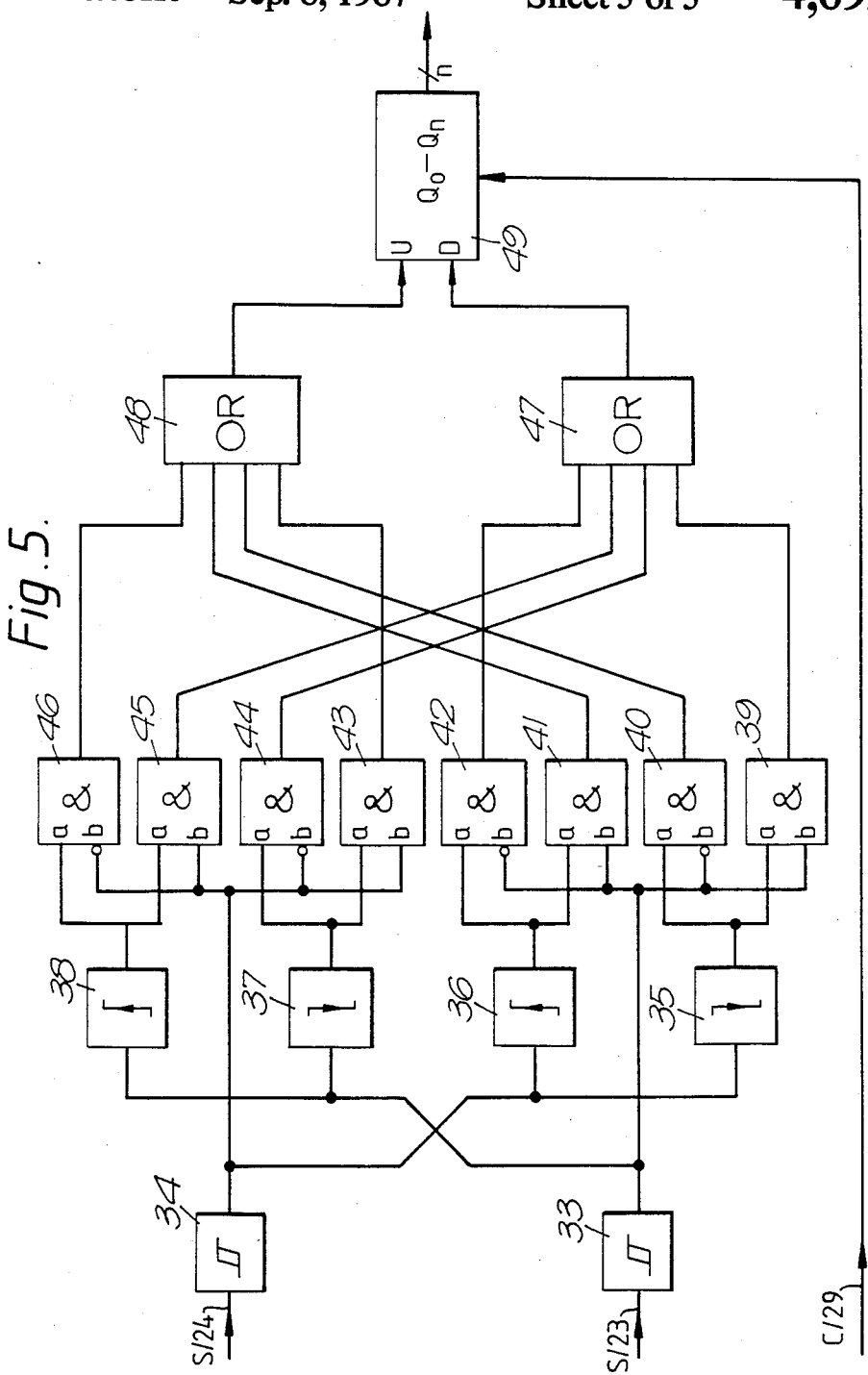

DEVICE FOR GENERATING A 2-AXIS CONTROL SIGNAL

BACKGROUND OF THE INVENTION

This invention relates to manually operable signal generating devices of a type suitable for use as interface devices for generating control signals which can be used to control movement of at least one discrete image portion in a display which is produced on the screen of a display device, for instance a television monitor.

Known signal generating devices of the above type are the roller- or tracker-ball and the toggle or joy stick. Each of these known devices can generate control signals for controlling movement of a discrete image portion such that the latter can be positioned anywhere in the display by appropriate manual manipulation of the device. The control signals generated by the devices can be considered to be co-ordinate control signals which represent the co-ordinates of any selected position in the display and which are used to drive display circuits to control the movement of the image portion from its current position in the display to the selected position.

In a computer-based information display system, there are many instances where interactive operation of the system by a user is based on visual feedback from displayed information. It is well-established that the above-mentioned known signal generating devices can be employed as interface devices to effect such interactive operation, and that the visual feedback from the display to a user obviates the need for the user having to look at such an interface device while operating it.

However, with each of these known signal generating devices the entire hand rather than a single finger has to be used to operate them, which can be a disadvantage when the device forms part of a user control console containing other types of interface device, for instance a keyboard. In particular, the need to engage the device with the entire hand can restrict the speed at which it can be taken into use. Also, a tracker- or roller-ball is intrinsically large in three dimensions, so that mounting it in a control console can be a problem; while problems of mechanical instability and inaccuracy can arise with a toggle or joy-stick.

SUMMARY OF THE INVENTION

It is an object of the present invention to provide an improved signal generating device of the type set forth above which does not suffer from these drawbacks.

According to the invention, a manually operably signal generating device of the type specified above comprises an actuating part which is movable by finger pressure to any position within a substantially plane window area, said actuating part being provided on a continuous loop member at least parts of which are flexible such as to be disposed about spaced-apart parallel guide surfaces to allow composite movement of the member along and around said guide surfaces in response to finger pressure applied to said actuating part, the device further comprising signal means responsive to said composite movement to generate said control signals.

By having an actuating part which only requires finger pressure to move it a signal device according to the invention is simpler and more convenient to use compared with the previously known devices which are operated using the entire hand.

In carrying out the invention, the actuating part is preferably a separate part secured to the loop member, although it could be simply a raised, grooved or otherwise identifiable integral portion of the loop member. As a separate part, the actuating part can include a push-button switch. It can then be arranged that this switch is required to be operated to implement different control functions.

In one particular embodiment of the invention, said guide surfaces are formed as curved surfaces at two opposite ends of a generally rectangular support block, and said continuous loop member is a sleeve having flexible portions close fitting about said curved surfaces for sliding reciprocal movement of the sleeve in a first direction normal to said curved surfaces and sliding reciprocal movement in a second direction parallel to said curved surfaces, the distance between the curved surfaces, and their dimensions relative to the width of said flexible portions of the sleeve, as determined by the dimensions of the support block, being such as to permit movement of the sleeve in said first and second directions to an extent appropriate for enabling said actuating part to be moved to any position in the plane window area.

This particular embodiment of a signal generating device according to the invention can be given a shallow or relatively flat construction by using a support block which is thin compared with its length and width. Such a construction has the advantage that it facilitates the accommodation of the device in a control console.

The portions (upper and lower) of the sleeve between said flexible portions can be rigid, or a wholly flexible sleeve may be preferable to facilitate maintaining the sleeve in close-fitting relationship with the support block. When a wholly flexible sleeve is provided, the upper surface of the support block may have a small amount of convex curvature to help keep the sleeve in firm contact against this upper surface.

To facilitate tensioning the sleeve in its close-fitting relationship with the support block, the entire sleeve or at least a section thereof can be elasticized. In the latter case, the section may comprise an "elastic joint" by which opposite ends of a length of flexible material are joined together to form the sleeve.

Alternatively, the support block can include tensioning means which is operable to urge against the sleeve to tension it about the block. Such tensioning means may be a spring-loaded bar located in a channel in the support block, the channel extending parallel to said guide surfaces.

Said signal means are suitably opto-electronic coupling means comprised by two position detectors one for each of said first and second directions of movement, each of which position detectors comprises a light grating movable with the sleeve with its bars lying normal to the direction of movement to be detected, a pair of light sensitive diodes located at one side of the grating, and a light source located at the other side of the grating, the two diodes of the pair being positioned offset one from the other in the direction concerned, the device further comprising logic circuitry which is responsive to the signal outputs from the two pairs of diodes to produce said control signals.

Conveniently, each light grating is provided as a series of alternate opaque and translucent strips at the underside of the sleeve, that is at the opposite side to that at which the actuating part is provided.

In order that the invention may be more fully understood, reference will be made by way of example to the accompanying drawings.

BRIEF DESCRIPTION OF THE DRAWING

FIG. 5 shows one form of logic circuit for producing control signals from the signal output of the opto-electronic coupler of FIG. 4.

DESCRIPTION OF THE PREFERRED EMBODIMENT

Figure 1:
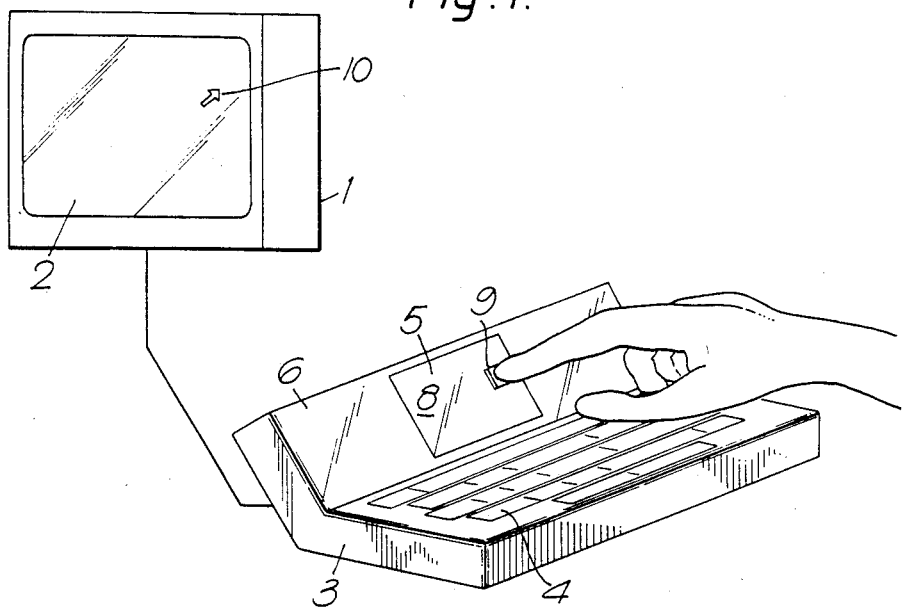
FIGS. 1 and 2 show diagrammatically display apparatuses comprising respective forms of control console and an associated display device.
Figure 2:
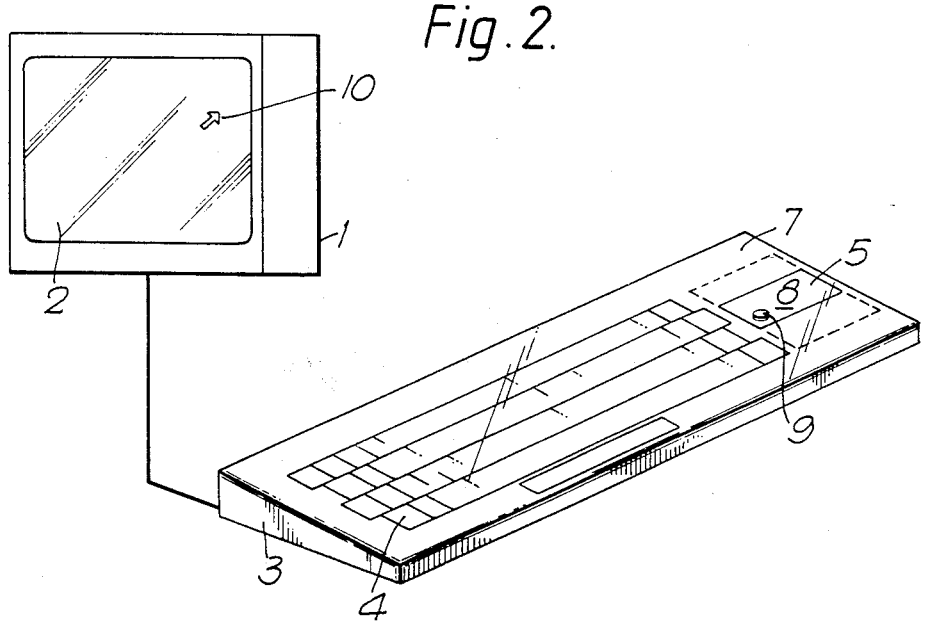

Referring to the drawings, the display apparatuses shown in FIGS. 1 and 2 each comprise a television monitor 1 having a display screen 2, and a remote control console 3. The control console 3 is assumed to contain micro-computer or video game circuitry which is accessed by a keyboard interface 4. There is also provided on the control console 3 as a second interface device, a signal generating device 5 in accordance with the invention. In FIG. 1, this device 5 is located at the center of a sloping panel 6 behind the keyboard interface 4; whereas in FIG. 2 it is located at the side of the keyboard interface 4 in the top panel 7.

The signal generating device 5 has a plane window area 8 which is defined by an aperture in the panel 6 or in the panel 7, as the case may be. An actuating knob 9 of the device 5 can be engaged by a finger, as illustrated in FIG. 1, so as to be moved by finger pressure to any position within the area 8. The movement of the actuating knob 9 is composite movement made up of reciprocal movement in orthogonal directions. As will be described presently with reference to FIGS. 3 to 5, the movement of the actuating knob 9 results in the production of co-ordinate control signals which represent the co-ordinates of the position of the actuating knob 9 within the area 8. These control signals can be used in conventional ways to drive suitable display circuits for determining the position of an image portion 10 of a display on the display screen 2. For instance, the control signals can be produced continually during movement of the actuating knob 9 to control the positioning of a cursor on the display screen, or to control movement of an element of a video game display. Alternatively, the control signals can be used to control a graphics input onto the display screen 2 in a manner analogous to such control as effected by an electronic "writing tablet". Another possible use is one which is analogous to touch selection of a displayed item as afforded by a touch-sensitive screen which overlays a display screen. For this latter use, a cursor would be moved to a selected position which is then "touch-selected", for instance by operating a push-button switch provided at the end of the actuating knob 9. Such a push-button switch can also be used to determine the start and finish of a graphics input. By reason of its single finger operation, the device 5 is extremely compatible for use with a keyboard interface, because it can be operated with very little movement of the hand from a normal typing position.

Figure 3:
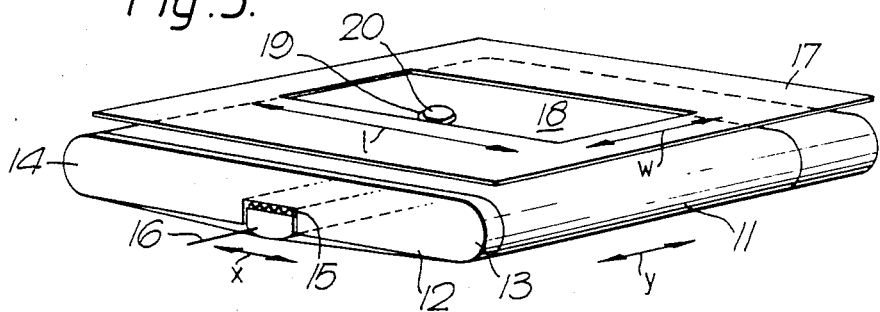
FIG. 3 shows diagrammatically a particular construction of signal generating device according to the invention.

The particular construction of signal generating device shown in FIG. 3 comprises a flexible sleeve 11 which is disposed about a support block 12 supported within the console 3. The block 12 is of generally rectangular shape and has curved guide surfaces at its two opposite ends 13 and 14. The flexible sleeve 11 is close-fitting on the block 12 for sliding reciprocal movement in the direction x, that is for rotational movement around the block 12. The block 12 has a greater dimension in the direction y than the width of the sleeve 11, so that the sleeve 11 can also undergo sliding reciprocal movement in the direction y.

It will be clear from FIG. 3 that the sliding reciprocal movement in the direction y should be rectilinear translation; that is, skewing about an axis perpendicular to the window area 8 is resisted. Such skewing is minimized as a result of tension in the sleeve 11 acting on the portions of the sleeve 11 in contact with the guide surfaces, in proportion to the ratio of the width of the sleeve in the direction y to the distance between the guide surfaces in the direction x. A channel 15 extends along the center of the block 12 in the direction y. This channel 15 accommodates a spring-loaded bar 16 for tensioning the sleeve 11 in its close-fitting relationship with the support block 12. However, the friction between the sleeve 11 and the support block 12 is kept low so that the sleeve slides very easily over the block. Also, the upper "flat" surface of the block 12 may have a small amount of convex curvature to help keep the sleeve 11 in firm contact against this upper surface. Conveniently, the sleeve 11 and block 12 are made of a plastic material, such as PVC, having a relatively low coefficient of friction. The sleeve 11 may alternatively be made of strong reinforced paper. If the block 12 is itself made of a compressible material, then the sleeve 11 may be fitted tightly onto the block by slightly compressing the latter. The spring-loaded bar 16 can then be dispensed with. As another alternative, which dispenses with the spring-loaded bar 16, the entire sleeve 11 or at least a section thereof can be elasticized. In the latter case, the section may comprise an "elastic joint" by which opposite ends of a length of flexible material are joined together to form the sleeve 11.

There is located above the sleeve/block combination 12/13, a plate 17 which corresponds to either of the panels 6 and 7 (FIGS. 1 and 2) and which defines a plane window area 18. An actuating knob 19, which is secured to the sleeve 11, is disposed within the area 18 and can be moved by applied finger pressure to any position within that area. Thus, the knob 19 can be moved in the direction x over a length l, and in the direction y over a length w, and corresponding movement of the sleeve 11 will be effected. As will be described next, this composite movement of the sleeve 11 can be detected by means of suitable detector means to produce control signals indicative of such movement. A push-button switch 20 is provided on the knob 19 for the possible uses discussed previously. In order that the edges of the sleeve 11 are never exposed in the window area 18, the sleeve is given a width just greater than twice the width w of the area 18 (i.e. in the direction y). The block 12 is then required to have a dimension of approximately three times the width w in the same direction y. The aspect ratio of the window area 18 is nominally that of the controlled display, which for a normal television screen is 4/3.

Figure 4A:
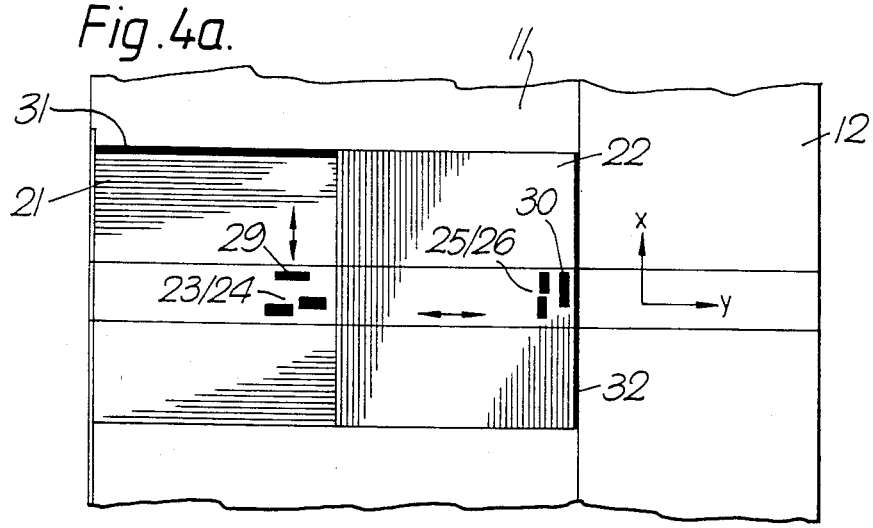
FIGS. 4a to 4c show details of one form of opto-electronic coupler for the device of FIG. 3.
Figure 4B:
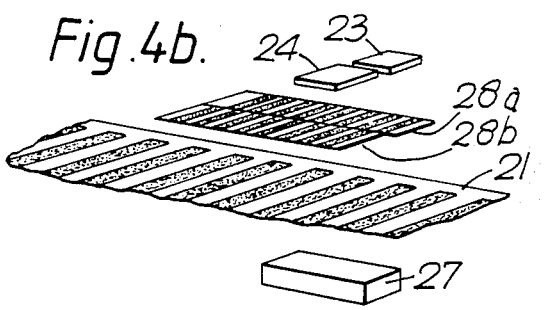
Figure 4C:
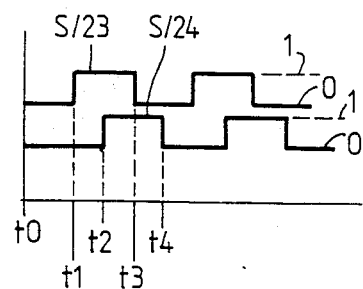

The signal generating device includes two position detectors (not shown in FIG. 3) for detecting movement of the knob 19 in the directions x and y, respectively. Each of these two position detectors is located at the underside of the device, that is at the side remote from the window area 18, and comprises a light grating formed on the sleeve 11 together with a pair of light sensitive diodes and an associated light source. Conveniently, these two position detectors have their diodes recessed into the bar 16 (when provided) and are urged into contact with the respective light grating due to the spring-loading of the bar 16. Otherwise, these diodes would be recessed into the underside of the support block 12. Details of these two position detectors are shown diagrammatically in FIGS. 4a to 4c. FIG. 4a shows fragmentary portions of the underside of the flexible sleeve 11 and the support block 12. Two light gratings 21 and 22 are formed on the sleeve 11 as a series of alternate opaque and translucent strips. The grating 21 is provided in respect of movement in the direction x and has its bars (opaque strips) lying normal to this direction. The grating 22 is provided in respect of movement in the direction y and has its bars lying normal to this latter direction. Two pairs of photo diodes 23/24 and 25/26 lie at one side of the two light gratings 21 and 22, respectively. In response to movement of the sleeve 11, these pairs of photo diodes receive interrupted light via the relevant grating from an associated light source located at the opposite side of the grating to the diodes. In order for the signal output produced by these diodes in response to received interrupted light being indicative of sleeve movement, the two diodes of each pair are positioned offset one from the other in the direction of movement concerned, so that one diode will produce its signal output before the other. FIG. 4b illustrates the positioning of the two diodes of the diode pair 23/24, and FIG. 4c shows the signal outputs S/23 and S/23 with different phases from these two diodes. FIG. 4b also shows for the diode pair 23/24 a light source 27 which is suitably a light-emitting diode. FIG. 4b further shows graticules 28a and 28b for the diode pair 23/24. These graticules 28a and 28b each have alternate opaque and translucent strips like the grating 21, and are offset one quarter of the bar spacing of the light grating 21 with respect to each other to achieve the diode offset. The other position detector having the diode pair 25/26 is similarly consititued. The diodes can themselves be offset with respect to each other, in which event the position detectors would not include the graticules (28). However, a detector aperture no wider than the width of each bar would then be required. The provision of the graticules enables higher measurement resolution by using thinner bars. In fact, the detector aperture (grating) can be of the same pitch as the light grating bars. The cyclic order of the four possible signal output states from the two diodes determines unambiguously the direction of motion. FIG. 5 shows a logic circuit for ascertaining this cyclic order. This logic circuit, which will be described later, may be implemented in hardware or by software. With such a four-phase position detector a bar spacing in the light grating of as much as 1 mm will give a resolution of 1 part in 250 for 6.25 cm. control travel. Finer resolution then becomes possible by reducing the bar spacing, but whether it would be useful depends on the extent of capability for fine motion control using a fingertip. However, the maximum resolution which is obtainable is probably limited principally by the extent to which the sleeve is subject to effect of skewing when moved. The "skewing" can be kept small by locating the two diodes of each pair as close together as possible in the direction normal to the direction in which they sense movement. Any rotation of the light grating bars away from their orthogonal relationship with the relevant direction of movement would upset the phase relationship between the detector components.

Because the signal outputs from the position detectors indicate movement only, some resetting means are required to serve as a zeroing sensor for producing a signal when a known "zero" position is reached by the actuating knob (19). This signal can then be used for resetting a position counter, both at the start of an operating session, and periodically throughout it to guard against "lost" pulses. The resetting means can be a mechanical switch (not shown) located in the bottom left hand corner of the window area 18 for operation when contacted by the actuating knob (19). Alternatively, as shown in FIG. 4a, the resetting means can be two further light-sensitive diodes 29 and 30, one for each direction of motion, which are positioned to detect an opaque border 31 and 32 of the appertaining light grating 21 or 22. In order to ensure initial zeroing, it is necessary to move the actuating knob (19) to the zero position at the start of an operating session.

Other forms of position detectors, for instance ones which are magnetically operable, may be used.

The logic circuit shown in FIG. 5 is provided in respect of each pair of diodes 23/24 and 25/26 (i.e. one logic circuit for each position detector). This logic circuit comprises two threshold detectors 33 and 34, four edge detectors 35 to 38, eight AND-gates 39 to 46, two OR-gates 47 and 48, and an up/down counter 49, connected as shown. The threshold detector 33 is connected to receive the signal output from one diode of a pair, say signal output S/23 from diode 23, and the other threshold detector 34 receives the signal output S/24 from the other diode 24.

In FIG. 4c, the two signal outputs S/23 and S/24 are shown relative to a time scale t0 to t4, during which they are at either a logic 0 level or a logic 1 level. The threshold detectors 33 and 34 determine which logic level prevails at any time, and the edge detectors 35 to 38 detect when changes in the logic levels occur. The following Table shows the resultant logic levels at the two inputs a and b of each of the AND-gates 39 to 46 during the instants t0 to t4. The cyclic order of these resultant logic levels determines which of the AND-gates 39 to 46 produce logic 1 outputs which, via the OR-gates 47 and 48, are applied to inputs U and D of the counter 49 to step this counter up or down. The count position of the counter 49 at outputs $Q_O$ to $Q_N$ signifies the subsisting position of the actuating knob (19) in the relevant direction. A reset input R of the counter 49 is connected to receive a reset or "clear" signal C/29 from the relevant zeroing sensor (29). In FIG. 4c, signal output S/23 leads the signal output S/24, thereby indicating that motion in the direction x is "upward" as seen in FIG. 4a. For this motion, AND-gates 46, 41, 43 and 40 are opened in turn during the instants t1 to t4, respectively, to apply logic 1 outputs to the input U of the counter 49.

TABLE

| GATES | INPUTS | TIME | | | | |
|---|---|---|---|---|---|---|
| | | t0 | t1 | t2 | t3 | t4 |
| 46 | a | 0 | 1 | 0 | 0 | 0 |

TABLE-continued

| GATES | INPUTS | TIME t0 | t1 | t2 | t3 | t4 |
|---|---|---|---|---|---|---|
| | b | 1 | 1 | 0 | 0 | 1 |
| 45 | a | 0 | 1 | 0 | 0 | 0 |
| | b | 0 | 0 | 1 | 1 | 0 |
| 44 | a | 0 | 0 | 0 | 1 | 0 |
| | b | 1 | 1 | 0 | 0 | 1 |
| 43 | a | 0 | 0 | 0 | 1 | 0 |
| | b | 0 | 0 | 1 | 1 | 0 |
| 42 | a | 0 | 0 | 1 | 0 | 0 |
| | b | 1 | 0 | 0 | 1 | 1 |
| 41 | a | 0 | 0 | 1 | 0 | 0 |
| | b | 0 | 1 | 1 | 0 | 0 |
| 40 | a | 0 | 0 | 0 | 0 | 1 |
| | b | 1 | 0 | 0 | 1 | 1 |
| 39 | a | 0 | 0 | 0 | 0 | 1 |
| | b | 0 | 1 | 1 | 0 | 0 |

It can be seen from the above Table that a level change at one input and the logic level of the other input gives the sense of movement in the direction concerned. The threshold detectors are required to have hysteresis to prevent "jitter" in operation. The edge detectors are suitably monostables which produce pulses of short width (e.g. 100 μs) compared with the minimum possible width of the pulses produced by the light sensitive diodes.

I claim:

1. A manually operable signal generating device for generating two-axis control signals, comprising
   an element defining a substantially planar window area, said window having a length in a first direction at least equal to a first given distance, and a width in a second direction, orthogonal to said first direction, at least equal to a second given distance,
   mounting means defining an axis parallel to said second direction, and having two guide surfaces and means for supporting said guide surfaces with respect to each other, said guide surfaces extending parallel to said second direction and having a dimension in said second direction greater than said second given distance, said guide surfaces being spaced apart a distance greater than said first given distance,
   a continuous loop member, at least parts of which are flexible, extending around said guide surfaces in slidable contact therewith, and between said guide surfaces in said first direction, at least those parts of said member in contact with said guide surfaces having a width in said second direction such that the ratio of such width to said distance by which the guide surfaces are spaced apart is sufficient to resist skewing about said guide surfaces, and said means for supporting further supporting said guide surfaces with respect to said element such that said window area is adjacent said loop member between said guide surfaces,
   an actuating part fixed at a location on said loop member, adjacent to and accessible through said window area, and movable by finger pressure to any position within said window area, movement of the actuating part in the second direction thereby sliding the entire loop member in the second direction; and movement of the actuating part in the first direction thereby causing said loop member to rotate about said axis and slide over said guide surfaces, and
   signal means responsive to movement in at least one of said directions for generating control signals representative of said movements.

2. A device as claimed in claim 1, characterized in that said mounting means comprises a generally rectangular support block having one pair of opposite ends formed with curved surfaces which constitute said guide surfaces,
   said continuous loop member is a sleeve having flexible portions close-fitting about said curved surfaces for sliding reciprocal movement of the sleeve in said second direction parallel to said axis, and sliding reciprocal rotational movement about said curved surfaces, when said actuating part is moved to any position within the planar window area.

3. A device as claimed in claim 1, characterized in that said actuating part is a separate part secured to the loop member.

4. A device as claimed in claim 3, characterized in that said separate part includes a push-button switch.

5. A device as claimed in claim 1, characterized in that said actuating part is formed by an integral portion of the loop member.

6. A device as claimed in claim 3, characterized in that said means for supporting comprises a support block having a length and width, in said first and second directions, much greater than a thickness of the block, so as to give said device a relatively flat construction.

7. A device as claimed in claim 6, characterized in that said loop member is wholly flexible.

8. A device as claimed in claim 7, characterized in that the said support block has an upper surface adjacent said window area with a slightly convex curvature, thereby keeping said loop member in firm contact with said upper surface.

9. A device as claimed in claim 8, characterized by comprising a spring loaded bar disposed in a channel in said support block, arranged parallel to said guide surfaces, said bar pressing against said loop member to tension it about the block.

10. A device as claimed in claim 9, characterized in that said signal means comprise two position detectors, one for each of said first and second directions of movement; each position detector comprising a light grating fixed to said loop member, the grating bars being arranged in a direction normal to the direction of movement to be detected, and two respective elements fixed in position with respect to said first and second directions, said two respective elements comprising a pair of light sensitive diodes located to one side of the grating, and a light source located to the other side of the grating, the diodes of a pair being positioned offset one from the other in the direction of movement to be detected; and said device further comprises logic circuitry responsive to the signal outputs from the two pairs of diodes to produce said control signals.

11. A device as claimed in claim 10, characterized in that each light grating is a series of alternate opaque and translucent strips arranged at the underside of the loop member, opposite the side adjacent said window area, and
   one of said respective elements fixed in position with respect to said first and second directions is arranged on said spring-loaded bar.

12. A device as claimed in claim 7, characterized in that said loop member comprises a length of flexible material having two ends, said ends being interconnected by an elastic member for tensioning said loop member.

13. A device as claimed in any one of claims 2, 1, 7 or 8, characterized in that said signal means comprise two position detectors, one for each of said first and second directions of movement; each position detector comprising a light grating fixed to said loop member, the grating bars being arranged in a direction normal to the direction of movement to be detected, and two respective elements fixed in position with respect to said first and second directions, said two respective elements comprising a pair of light sensitive diodes located to one side of the grating, and a light source located to the other side of the grating, the diodes of a pair being positioned offset one from the other in the direction of movement to be detected; and said device further comprises logic circuitry responsive to the signal outputs from the two pairs of diodes to produce said control signals.

14. A manually operable signal generating device for generating two-axis control signals, comprising an element defining a substantially planar window area, said window having a length in a first direction at least equal to a first given distance, and a width in a second direction, orthogonal to said first direction, at least equal to a second given distance, mounting means defining an axis parallel to said second direction, and having two guide surfaces and means for supporting said guide surfaces with respect to each other, said guide surfaces extending parallel to said second direction and having a dimension in said second direction greater than said second given distance, said guide surfaces being spaced apart a distance greater than said first given distance, a continuous loop member, at least parts of which are flexible, extending around said guide surfaces in slidable contact therewith, and between said guide surfaces in said first direction, at least a portion of said loop member having a width in said second direction at least equal to said second given distance, and at least those parts of said member in contact with said guide surfaces having a width in said second direction such that the ratio of such width to said distance by which the guide surfaces are spaced apart is sufficient to resist skewing about said guide surfaces, and said means for supporting further supporting said guide surfaces with respect to said element such that said window area is adjacent said loop member between said guide surfaces, an actuating part fixed at a location on said loop member adjacent to and accessible through said window area, and, movable by finger pressure to any position within said window area, movement of the actuating part in the second direction thereby sliding the entire loop member in the second direction; and movement of the actuating part in the first direction thereby causing said loop member to rotate about said guide surfaces, and signal means responsive to movement in at least one of said directions for generating control signals representative of said movement, said signal means comprising an element fixed to said loop member, having a first pattern oriented in said first direction, with a pattern length at least equal to said first given distance; and a second pattern oriented in said second direction with a pattern length at least equal to said second given distance; and means, fixed with respect to said window in said first and second directions, for sensing composite movement of said patterns.

15. A device as claimed in claim 14, characterized in that said loop member is a sleeve, having a given width in said second direction along at least substantially the entire length of said sleeve, greater than said second given distance, thereby resisting tendency of said sleeve to skew about said guide surfaces.

16. A device as claimed in claim 14 or 15, characterized in that said means for sensing comprises an optical emitting element and two respective optical sensing elements for sensing movement in each respective direction.

* * * * *